United States Patent
Mochida

(10) Patent No.: US 10,449,639 B2
(45) Date of Patent: Oct. 22, 2019

(54) MACHINING ROUTE DISPLAY DEVICE

(71) Applicant: FANUC CORPORATION, Minamitsuru-gun, Yamanashi (JP)

(72) Inventor: Takeshi Mochida, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 10 days.

(21) Appl. No.: 15/943,101

(22) Filed: Apr. 2, 2018

(65) Prior Publication Data

US 2018/0290246 A1 Oct. 11, 2018

(30) Foreign Application Priority Data

Apr. 7, 2017 (JP) .................. 2017-076927

(51) Int. Cl.
  *B23K 37/02* (2006.01)
  *B23K 26/70* (2014.01)
  *B23K 26/03* (2006.01)
  *B23K 26/38* (2014.01)
  *G05B 19/19* (2006.01)
  *G05B 19/4068* (2006.01)

(52) U.S. Cl.
  CPC ........ *B23K 37/0258* (2013.01); *B23K 26/032* (2013.01); *B23K 26/38* (2013.01); *B23K 26/705* (2015.10); *B23K 37/0288* (2013.01); *G05B 19/19* (2013.01); *G05B 19/4068* (2013.01); *B23K 26/702* (2015.10); *G05B 2219/35481* (2013.01); *G05B 2219/39573* (2013.01); *G05B 2219/45041* (2013.01)

(58) Field of Classification Search
  CPC .... B23K 26/032; B23K 26/38; B23K 26/702; B23K 26/705; B23K 37/0258; B23K 37/0288; G05B 19/19; G05B 2219/35481; G05B 2219/39573; G05B 2219/45041
  See application file for complete search history.

(56) References Cited

U.S. PATENT DOCUMENTS 9,304,507 B2 4/2016 Tezuka et al.
2015/0273861 A1* 10/2015 Setoue .................. B41J 2/442
  347/232

FOREIGN PATENT DOCUMENTS

| JP | H03238184 A | 10/1991 |
| JP | H04059195 A | 2/1992 |
| JP | H07072914 A | 3/1995 |
| JP | 2733294 B | 3/1998 |

(Continued)

Primary Examiner — Kenneth M Lo
Assistant Examiner — Chad G Erdman
(74) Attorney, Agent, or Firm — RatnerPrestia

(57) ABSTRACT

A machining route display device includes a positional information acquiring section configured to acquire positional information of a drive shaft in a predefined control cycle, a laser machining head coordinate calculator configured to calculate a coordinate value of the laser machining head from the positional information of the drive shaft and machine configuration information of a laser machine, a laser output acquiring section configured to acquire a laser output value from a laser, a display format setting section configured to set a display format of the laser according to the laser output value acquired by the laser output acquiring section, and a display section configured to display a machining route based on the coordinate value of the laser machining head and the display format.

3 Claims, 3 Drawing Sheets

(56) References Cited

FOREIGN PATENT DOCUMENTS

| | | | | |
|---|---|---|---|---|
| JP | 2003311450 A | | 11/2003 | |
| JP | 2010-262442 A | * | 11/2010 | ......... G05B 19/5053 |
| JP | 2010262442 A | | 11/2010 | |
| JP | 2013045332 A | | 3/2013 | |
| JP | 2014133231 A | | 7/2014 | |

* cited by examiner

MACHINING ROUTE DISPLAY DEVICE

CROSS-REFERENCE TO RELATED APPLICATION

This application is a new U.S. Patent Application that claims benefit of Japanese Patent Application No. 2017-076927, filed Apr. 7, 2017, the disclosure of this application is being incorporated herein by reference in its entirety for all purposes.

BACKGROUND OF THE INVENTION

1. Field of the Invention

The present invention relates to a machining route display device that displays a machining route or trace for laser machining.

2. Description of the Related Art

When a workpiece (hereinafter, simply referred to as "work") is machined, for example, is cut by using a laser machine, a laser machining head is moved above a work along a desired machining route. And it is widely known that the machining route is displayed on a display section.

In JP 2733294 B, "when displaying a figure on a display unit, line segments are displayed in different colors according to a speed condition of laser machining" is described.

SUMMARY OF THE INVENTION

However, in JP 2733294 B, the speed condition and the display color are simply defined in a table format beforehand according to the length of the line segment of the machining route. In addition, in JP No. 2733294 B, the whole length part of a line segment has an identical display color. Accordingly, it is difficult for an operator who does not know the contents in the table to intuitively understand the speed condition of the machining route. In addition, with such a configuration described in JP 2733294 B, the operator cannot recognize a relationship between a machining route and a laser output.

Therefore, a machining route display device by which a relationship between the machining route and the laser output can be easily recognized is demanded.

According to a first aspect of the present disclosure, a machining route display device configured to display a machining route in a laser machine configured to machine a workpiece by using a laser output from a laser machining head, while relatively moving the laser machining head and the workpiece by using at least one drive shaft, is provided and the machining route display device includes: a positional information acquiring section configured to acquire positional information of the at least one drive shaft in a predefined control cycle; a laser machining head coordinate calculator configured to calculate a coordinate value of the laser machining head from the positional information of the at least one drive shaft and machine configuration information of the laser machine; a laser output acquiring section configured to acquire a laser output value of the laser output from the laser machining head; a display format setting section configured to set a display format of the laser according to the laser output value acquired by the laser output acquiring section; and a display section configured to display the machining route, based on a coordinate value of the laser machining head calculated by the laser machining head coordinate calculator and a display format set by the display format setting section.

In the first aspect, the machining route is displayed after the display format of the laser is set according to a laser output value, and therefore, a relationship between the machining route and the laser output can be easily recognized.

The objects, features and advantages as described above, and other objects and advantages of the present invention will become more apparent from the following description of the embodiments in connection with the accompanying drawings.

DETAILED DESCRIPTION

Figure 1:
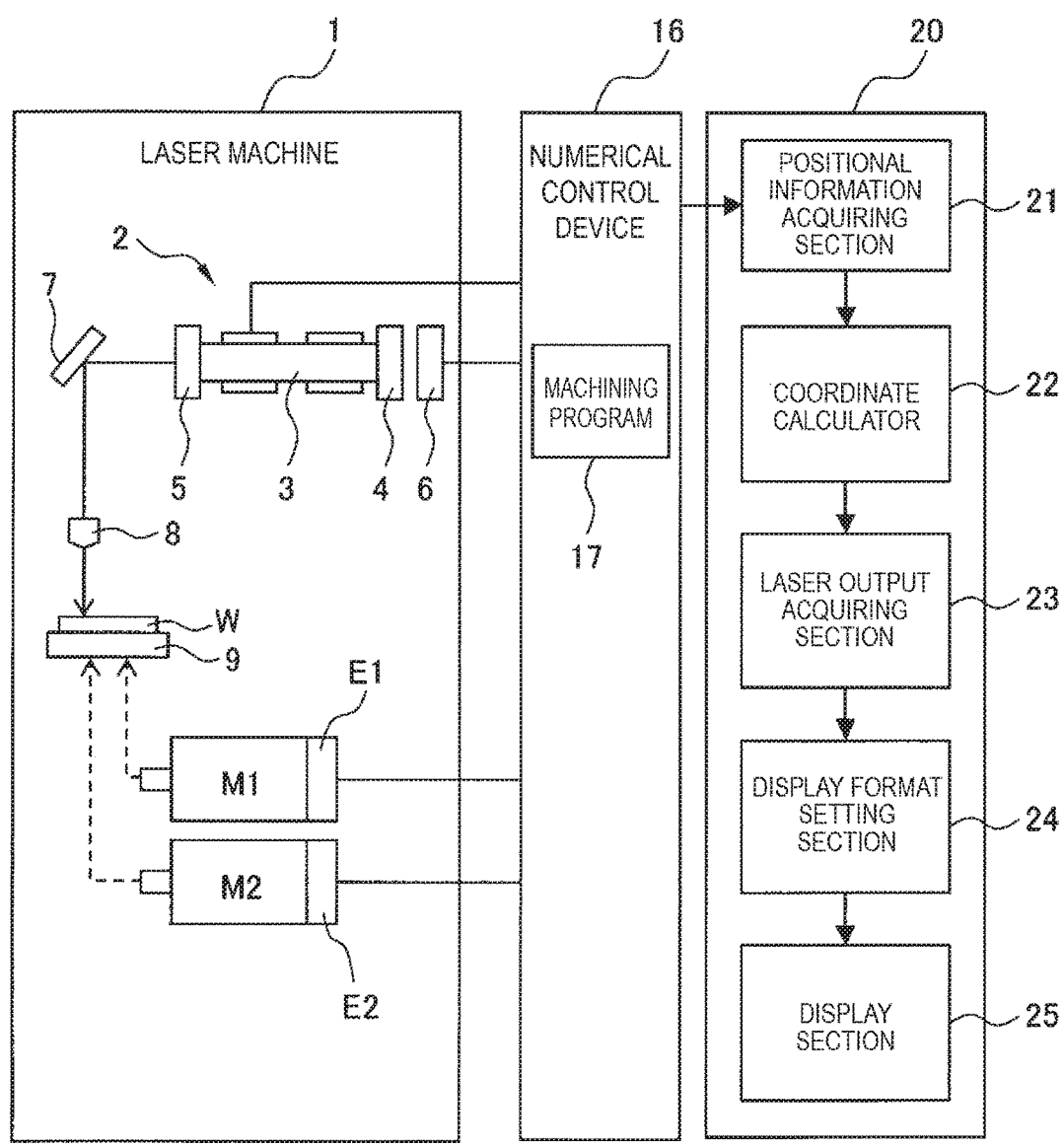
FIG. 1 is a functional block diagram of a machining route display device according to a first embodiment.

Embodiments of the present invention will be described below with reference to the accompanying drawings. Throughout the drawings, corresponding components are denoted by common reference numerals. Scales in the drawings are changed as appropriate in order to facilitate understanding.

FIG. 1 is a functional block diagram of a machining route display device according to a first embodiment. As illustrated in FIG. 1, a machining route display device 20 is coupled to a laser machine 1 via a numerical control device 16.

The laser machine 1 includes a laser oscillator 2. The laser oscillator 2 includes a discharge tube 3 including a rear mirror 4, which is a partly reflecting mirror provided on one end of the discharge tube 3, and an output mirror 5, which is a partial reflection mirror provided on another end of the discharge tube 3. On the back side of the rear mirror 4, a laser power sensor 6 which detects an output value of a laser that has been oscillated is provided. In addition, the laser machine 1 includes a reflecting mirror 7 which reflects a laser output from the output mirror 5, and a laser machining head 8 including a condenser lens that condenses a laser reflected.

A laser output from the laser machining head 8 performs machining, for example, cutting a work W placed on a movable stand 9. The movable stand 9 is movable on an XY-plane. Drive shafts of the movable stand 9 in X direction and Y direction are respectively coupled to motors, e.g., servomotors M1 and M2. The servomotors M1 and M2 are respectively equipped with position detectors E1 and E2, e.g., encoders that detect actual positions of the drive shafts in a predefined control cycle.

The movable stand 9 moves in at least one direction, and includes the drive shafts and motors that are identical in number to the directions in which the movable stand 9 is movable. The stand on which the work W is placed may be fixed and thus the servomotors M1 and M2 may enable the laser machining head 8 to move on the XY-plane.

A numerical control device 16 includes a machining program 17 used to machine the work W by using a laser, and the laser machine 1 is controlled according to the machining program 17. The machining program 17 includes information of movements of the respective drive shafts. Such information is converted as appropriate and is acquired as positional information by a positional information acquiring section 21 to be described later.

The machining route display device 20 may serve as a digital computer including a CPU, a memory, etc. coupled to each other via a bus, etc. The machining route display device 20 includes the positional information acquiring section 21 that acquires positional information of at least one drive shaft of the movable stand 9 in a certain control cycle. The positional information is obtained from the machining program 17 or from the position detectors E1 and E2 attached to the servomotors M1 and M2, for driving at least one drive shaft.

In addition, the machining route display device 20 includes a laser machining head coordinate calculator 22 that calculates a coordinate value of the laser machining head 8 from the positional information of at least one drive shaft and machine configuration information of the laser machine 1, and a laser output acquiring section 23 that acquires a laser output value of a laser output from the laser machining head 8. The laser output value acquired by the laser output acquiring section 23 is at least one of a laser output command value of the laser machining head 8 obtained from the machining program 17 and a laser output actual value of the laser machining head 8 obtained by using the laser power sensor 6. The machine configuration information of the laser machine 1 substantially denote the dimension of the laser machine 1.

In addition, the machining route display device 20 includes a display format setting section 24 that sets a display format of a laser according to the laser output value acquired by the laser output acquiring section 23. Furthermore, the machining route display device 20 includes a display section 25 that displays a machining route, based on a coordinate value of the laser machining head calculated by the laser machining head coordinate calculator 22 and a display format set by the display format setting section 24.

The CPU of the machining route display device 20 serves as the positional information acquiring section 21, the laser machining head coordinate calculator 22, the laser output acquiring section 23, and the display format setting section 24. The display section 25 can be a liquid crystal display, a CRT, etc.

Figure 2:
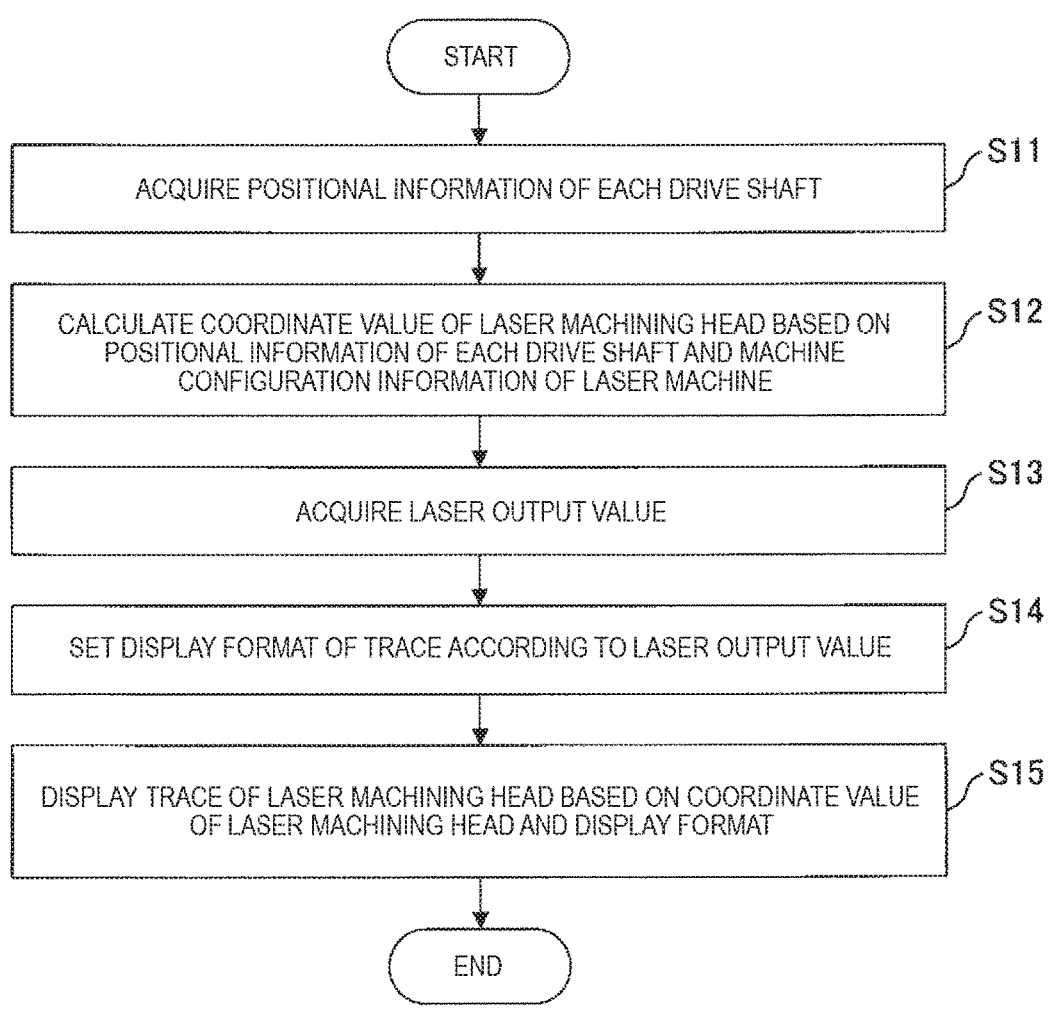
FIG. 2 is a flowchart illustrating an operation of the machining route display device according to the first embodiment.

FIG. 2 is a flowchart illustrating an operation of the machining route display device according to the first embodiment. First, in Step S1 in FIG. 1, the positional information acquiring section 21 acquires positional information of each drive shaft of the movable stand 9 in a unit time. The positional information can be a position command of each drive shaft acquired from the machining program 17 and/or an actual position of each drive shaft detected by the position detector E1, E2. For the purpose of simplicity, in the description below, it is supposed that the positional information is the position command.

Subsequently, in Step S12, the coordinate calculator 22 calculates coordinates of the laser machining head 8, based on the positional information in a unit time. In a case where the positional information is acquired from the machining program 17, the coordinates of the laser machining head 8 constitute a commanded machining route of a laser. In a case where the positional information is acquired from the position detector E1, E2, the coordinates of the laser machining head constitute an actual machining route of a laser.

Subsequently, in Step S13, the laser output acquiring section 23 acquires the above-described laser output value in a unit time. In Step S14, the display format setting section 24 sets the display format for the machining route according to the laser output value obtained in Step S13.

Figure 3:
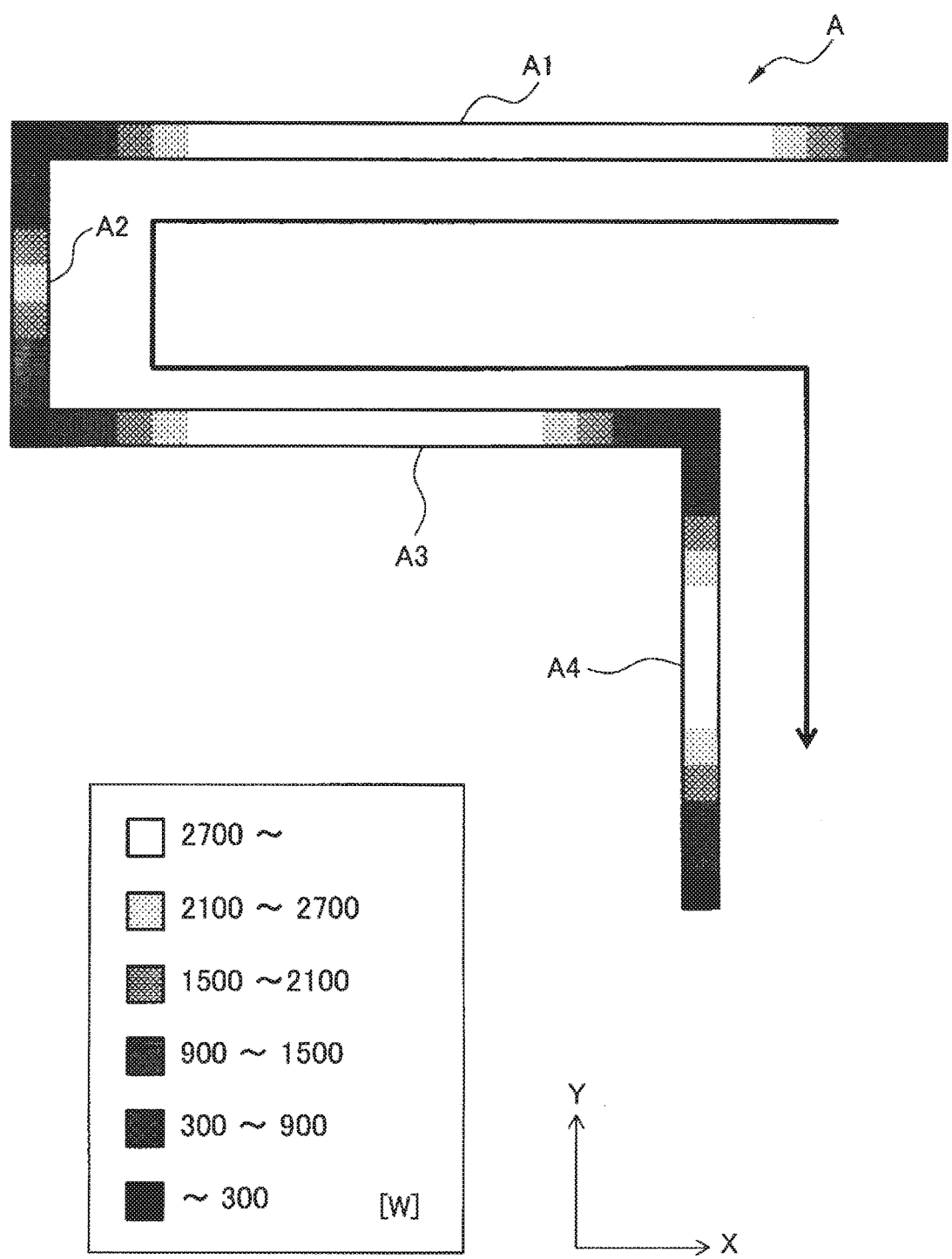
FIG. 3 is an example diagram of a machining route.

FIG. 3 is an example diagram of the machining route. In FIG. 3, a machining route A including a plurality of line segments that extend in X direction and Y direction is illustrated. The machining route A illustrated in FIG. 3 includes line segments A1 to A4. The line segments A1 and A3 extend only in X direction and the line segments A2 and A4 extend only in Y direction. Note that each of the line segments A1 to A4 may have components in both X and Y directions. The arrow in FIG. 3 illustrates a traveling direction of the laser machining head 8.

In the lower left part in FIG. 3, a table T is illustrated. The table T illustrates a density degree of colors of the machining route A to be defined according to the magnitude of the laser output value. The table T is prepared beforehand in the display format setting section 24. Specifically, in the table T, the laser output values are classified into a plurality of levels, for example, six levels. The lowest level of the laser output values (300 W or lower) is set to the lightest color, for example, white, and the highest level of the laser output values (2700 N or higher) is set to the darkest color, for example, black. Through these levels, the density degree of the colors is gradually increased from the lightest color to the darkest color.

In Step S14, the display format setting section 24 sets the density degree of the color for the coordinate value of the laser machining head 8 in a control cycle, according to the magnitude of the laser output value. In FIG. 3, the display format setting section 24 sets the density degree to change between white and back. In another embodiment, not illustrated, the display format setting section 24 may set color hues to change in a greater number of colors. For example, the lowest of the laser output values is set to blue, the highest of the laser output values is set to yellow, and the middle between the lowest and the highest is set to red. Then, the color hues may gradually change between the level of blue and the level of red, and between the level of red and the level of yellow.

Referring to FIG. 2 again, in Step S15, the display section 25 displays a machining route A based on the coordinate value of the laser machine head 8 and the display format. As illustrated in FIG. 3, the machining route A is displayed after the display format of a laser, for example, the density level of the color, is set according to the laser output value. With such a configuration, it is to be understood that an operator can intuitively recognize the relationship between the machining route and the laser output.

For example, in FIG. 3, it can be found that the laser output is lowered at corners of the machining route A, i.e., the connected parts of the line segments A1 to A4. In addition, in FIG. 3, the line segment A2 is shorter than the line segments A1, A3, and A4. As a result, the line segment A2 does not have the highest level of the laser output value, i.e., the lightest color. In other words, the line segment A2 has a short distance, and therefore, it can be found that the maximum laser output cannot be provided on the line segment A2.

As described above, the laser output acquiring section 23 acquires the laser output command value or the laser output actual value. Accordingly, the display section 25 displays the machining route A by using the display format to be defined by the laser output command value, or displays the machining route A by using the display format to be defined by the output actual value. Therefore, the relationship between the laser output command value and the machining route A or between the laser output actual value and the machining route A can be easily recognized.

In addition, in a case where the positional information is obtained as a position command obtained from the machining program 17, the relationship between the laser output and the machining route constituted with command positions can be easily recognized. In the same manner, in a case where the positional information is obtained as an actual position obtained from the position detectors E1 and E2, the relationship between the laser output and the machining route constituted with actual positions can be easily recognized. In addition, a case where the above relationships are displayed on the display section 25 at the same time is also included in the scope of the present embodiment.

Aspects of the Disclosure

According to a first aspect, a machining route display device (20) configured to display a machining route in a laser machine (1) configured to machine a workpiece (W) by using a laser output from a laser machining head (8) while relatively moving the laser machining head and the workpiece by using at least one drive shaft is provided, and the machining route display device includes a positional information acquiring section (21) configured to acquire positional information on at least one drive shaft in a predefined control cycle, a laser machining head coordinate calculator (22) configured to calculate a coordinate value of the laser machining head, based on the positional information of the at least one drive shaft and machine configuration information of the laser machine, a laser output acquiring section (23) configured to acquire a laser output value of the laser output from the laser machining head, a display format setting section (24) configured to set a display format of the laser according to the laser output value acquired by the laser output acquiring section, and a display section (25) configured to display the machining route based on a coordinate value of the laser machining head calculated by the laser machining head coordinate calculator and a display format set by the display format setting section.

According to a second aspect, in the first aspect, the display format is at least one of a display color of the laser on the display section and a density level of the display color.

According to a third aspect, in the first or second aspect, the laser output value acquired by the laser output acquiring section is at least one of a laser output command value of the laser machining head obtained from the machining program and a laser output actual value of the laser machining head obtained by using a laser power sensor.

According to a fourth aspect, in any one of the first to third aspects, the positional information acquired by the positional information acquiring section is at least one of positional information obtained from the machining program configured to be used to machine the workpiece by using the laser, and positional information obtained from a position detector configured to drive the at least one drive shaft.

Effects of Aspects

According to the first aspect, a relationship between a machining route and a laser output can be easily recognized.

According to the second aspect, a display color and/or a density degree of the display color is changed according to a laser output value, and therefore, an operator can intuitively recognize the relationship between the machining route and the laser output.

According to a third aspect, a relationship between a laser output command value or a laser output actual value and the machining route can be easily recognized.

According to a fourth aspect, positional information obtained from a machining program is a position command, and positional information obtained from a position detector is an actual position. The relationship between the laser output and the machining route constituted with command positions, and relationship between the laser output and the machining route constituted with actual positions can be easily recognized. These can also be displayed on the display section 25 at the same time.

Although the present invention has been described using a representative embodiment, it will be clear to one skilled in the art that the above-described variations, as well as other modifications, omissions, and additions, can be made without departing from the scope of the present invention.

The invention claimed is:

1. A machining route display device configured to display a machining route in a laser machine configured to machine a workpiece by using a laser output from a laser machining head, while relatively moving the laser machining head and the workpiece by using at least one drive shaft, the machining route display device comprising:
    a positional information acquiring section configured to acquire positional information of the at least one drive shaft in a predefined control cycle;
    a laser machining head coordinate calculator configured to calculate a coordinate value of the laser machining head from the positional information of the at least one drive shaft and machine configuration information of the laser machine;
    a laser output acquiring section configured to acquire a laser output value of the laser output from the laser machining head;
    a display format setting section configured to set at least one of a display color of the laser and a density degree of the display color as a display format; and
    a display section configured to display the machining route, based on a coordinate value of the laser machining head calculated by the laser machining head coordinate calculator and a display format set by the display format setting section;
    wherein at least one of the display color of the laser and the display density of the display color is changed in accordance with the laser output value acquired by the laser output acquiring section.

2. The machining route display device according to claim 1, wherein the laser output value acquired by the laser output acquiring section is at least one of a laser output command value of the laser machining head obtained from the machining program and a laser output actual value of the laser machining head obtained by using a laser power sensor.

3. The machining route display device according to claim 1, wherein the positional information acquired by the positional information acquiring section is at least one of positional information obtained from a machining program configured to machine the workpiece by using the laser and positional information obtained by a position detector configured to drive the at least one drive shaft.

* * * * *